(12) United States Patent
Baldwin et al.

(10) Patent No.: US 8,638,008 B2
(45) Date of Patent: Jan. 28, 2014

(54) 380 VOLT DIRECT CURRENT POWER DISTRIBUTION SYSTEM FOR INFORMATION AND COMMUNICATION TECHNOLOGY SYSTEMS AND FACILITIES

(75) Inventors: Mark Harry Baldwin, Davidsonville, MD (US); David Edmund Geary, Bowie, MD (US); Timothy Edward Martinson, Erie, PA (US)

(73) Assignee: Direct Power Tech IP, LLC, Bowie, MD (US)

( * ) Notice: Subject to any disclaimer, the term of this patent is extended or adjusted under 35 U.S.C. 154(b) by 507 days.

(21) Appl. No.: 12/976,383

(22) Filed: Dec. 22, 2010

(65) Prior Publication Data

US 2011/0148213 A1 Jun. 23, 2011

Related U.S. Application Data

(60) Provisional application No. 61/289,109, filed on Dec. 22, 2009.

(51) Int. Cl.
*H02J 9/00* (2006.01)
(52) U.S. Cl.
USPC .......................................... 307/64; 307/147
(58) Field of Classification Search
USPC ................................... 307/147, 64
See application file for complete search history.

(56) References Cited

U.S. PATENT DOCUMENTS

| | | | |
|---|---|---|---|
| 5,712,779 A * | 1/1998 | Sheppard et al. | 363/69 |
| 5,861,684 A | 1/1999 | Slade et al. | |
| 6,278,624 B1 | 8/2001 | Nelson | |
| 7,141,894 B2 | 11/2006 | Kraus | |
| 7,421,599 B2 | 9/2008 | Bahali et al. | |
| 7,492,057 B2 * | 2/2009 | Baldwin et al. | 307/64 |
| 7,560,831 B2 | 7/2009 | Whitted et al. | |
| 7,633,181 B2 | 12/2009 | Gross et al. | |
| 2002/0057018 A1 | 5/2002 | Branscomb et al. | |
| 2008/0278003 A1 | 11/2008 | Pouchet et al. | |
| 2009/0072624 A1 | 3/2009 | Towada | |
| 2009/0309570 A1 | 12/2009 | Lehmann et al. | |
| 2010/0042860 A1 | 2/2010 | Kwon et al. | |
| 2010/0275441 A1 | 11/2010 | Rasmussen et al. | |

* cited by examiner

*Primary Examiner* — Robert L. Deberadinis
(74) *Attorney, Agent, or Firm* — Ronald E. Prass, Jr.; Prass LLP

(57) ABSTRACT

A method and a modular direct current power distribution system. A distribution panel may receive alternating current power with a voltage range between 200 volts and 15000 volts. A modular rectifier may convert the alternating current power from the distribution panel to direct current power with a range of 250 volts to 600 volts. An end feed box may receive alternative energy power from an alternative energy power source. A power pathway module may distribute the direct current power from the modular rectifier to a set of information and communication technology equipment. An electrical protection system may guard against electrical damage.

10 Claims, 9 Drawing Sheets

100

200

900

380 VOLT DIRECT CURRENT POWER DISTRIBUTION SYSTEM FOR INFORMATION AND COMMUNICATION TECHNOLOGY SYSTEMS AND FACILITIES

BACKGROUND

1. Cross Reference to Related Application

This application is based upon and claims benefit of copending and co-owned U.S. Provisional Patent Application Ser. No. 61/289,109 entitled "400v DC POWER DISTRIBUTION SYSTEM FOR ENERGY EFFICIENT INFORMATION AND COMMUNICATION TECHNOLOGY SYSTEMS AND AN INTEGRAL POWER/ENERGY CONTROL SYSTEM FOR THE INTEGRATION OF RENEWABLE ENERGY SOURCES AND ENERGY STORAGE," filed with the U.S. Patent and Trademark Office on Dec. 22, 2009 by the inventors herein, the specification of which is incorporated herein by reference.

2. Field of the Invention

The present invention relates generally to an energy efficient information and communication technology (ICT) power distribution system. The present invention further relates to the direct current (DC) electrical distribution of nominal 380 volts power, with a range of 250 volts to 600 volts, to DC powered ICT loads.

3. Introduction

In recent years, interest in how electricity is generated, transported, and used has increased. The continued growth of digital electrical loads in today's markets has finally reached a pattern and density that may indicate change to power generation and delivery.

One solution may be to create methods and infrastructure to enable digital loads to be supported by digital power, such as direct current (DC) power. Research has provided the insight that no one solution minimizes carbon footprint or energy dependence. Modern power electronics, coupled with the need to expand the use of renewable energy sources, may make DC power a standard option in a modern power grid infrastructure.

SUMMARY OF THE INVENTION

A method and a modular direct current power distribution system. A facility may receive alternating current power with a voltage range between 200 volts and 15000 volts. A modular rectifier may convert the alternating current power from the distribution panel to direct current power with a range of 250 volts to 600 volts. An end feed box may receive alternative energy power from an alternative energy power source. A power pathway module may distribute the direct current power from the modular rectifier to a set of information and communication technology equipment. This direct current power may also be used to feed other facility loads, such as lighting, and motorized mechanical systems, such as heating, ventilating, and air conditioning systems. An electrical protection system may guard against electrical damage.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
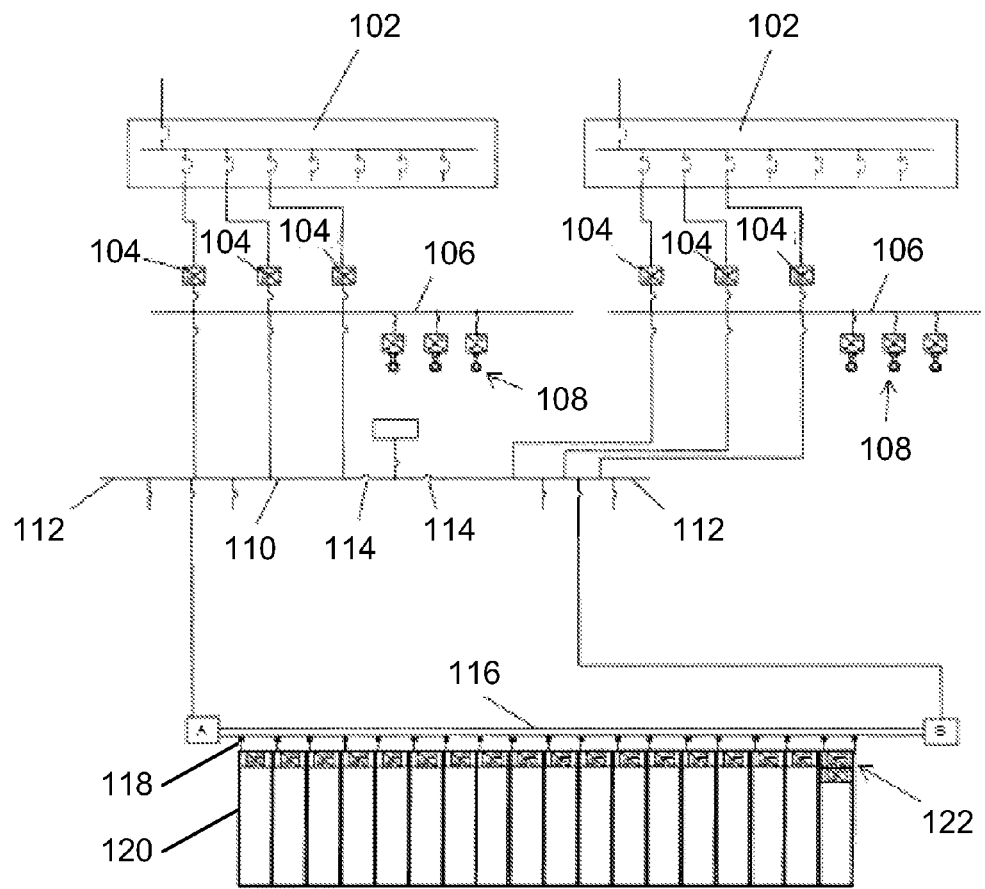
FIG. 1 is an exemplary high reliability direct current power distribution system.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, a direct current (DC) power distribution system, and a set of instructions, and other embodiments that relate to the basic concepts of the invention. The set of instructions may reside in a storage medium. The set of instructions may be executable by a processor to implement a method for DC power distribution. The set of instructions may also reside external to the local system, such as integration with a configuration management database (CMDB) to complete international technology infrastructure library (ITIL) objectives.

Conventional systems may not satisfy some basic energy system requirements. A more useful power distribution system may provide a high reliability energy source and delivery for computing, communications, laboratory, research and medical care loads. A modular DC power distribution system may provide energy storage to ride through normal power source outages and for peak demand or peak shaving loads. A modular DC power distribution system may use renewable energy sources for free energy generation. A modular DC power distribution system may improve energy efficiency for lighting and motor loads.

DC power distribution set at a nominal 380 volts may allow for the elimination of high cost static switches and active paralleling of alternating current (AC) sources, as coupling multiple DC sources may be as simple as matching output voltages. Information and communication technology (ICT) equipment equipped with 380 volt DC power supplies, instead of AC power supplies, may operate with 20-40% less heat, reduce power consumption by up to 30%, increase system reliability, offer flexibility to installations, and decrease maintenance requirements.

A high reliability 380 volt DC electrical power distribution system may avoid the disadvantages of an AC power system. The DC power distribution system may be safer than a comparable AC system by the use of faster acting circuit protection devices, ICT equipment-based battery back-up, and the use of blocking diodes.

Additionally, lower component count may result in higher system efficiency, greater reliability, less maintenance, and lower cost. A modular and flexible design may allow for system growth as ICT power requirements grow. A modular, highly efficient rectifier design may provide a plug-and-play modular growth capability and internal redundancy. Additional value may be added by integrating real-time control of individual rectifiers to match information technology (IT) computing, storage, communication, and heating, ventilating, and air conditioning (HVAC) requirements. Further management may provide control over power demand compared to IT uptime value to allow shedding of less critical applications while on reserve power during an outage. A power pathway module, such as a modular busway system or wire and conduit with panel boards, may enable growth and permit redundant DC sources at critical loads. DC rated plug-in modules may be energized on the bus without interruption of critical loads. DC power distribution may avoid downstream transfer switches or static switches. DC power distribution may eliminate harmonics found on AC systems. DC power distribution may eliminate stand-alone uninterruptible power supply requirements. DC power distribution may provide a more efficient interface with alternative energy power sources, or "green" power sources, that typically produce a DC output, such as wind power, solar power, fuel cells, zinc-bromine batteries, and other alternative energy power sources.

A modular DC power distribution system may have a nominal voltage of 380 volts with a high voltage operational range between 250v DC to 600v DC utilizing new industry provided components rated and configured to provide this new electrical distribution system topology. Power to this power distribution system may originate through a modular rectifier system which is configured for this system topology with the capability of converting 208 volts, 400 volts, 480 volts, 600 volts, 5 kilovolts, or 15 kilovolts of AC to a regulated 380 volts DC with an operating output range of 250 volts DC to 600 volts DC.

The modular DC power distribution system may implement an electrical protection system to protect against electrical damages, such as arc flash exposure, electrical surges, general faults, and short circuits. The electrical protection system may include 380v DC rated fast acting circuit breakers and fuses, blocking diodes, shunt trips, spring activated latching connectors for plug-and-play capabilities, voltage metering, current metering, and power metering. Blocking diodes my block power or current transmissions from back-feeding fault currents to other areas during fault conditions. The modular DC power distribution system may have an overhead busway system with an end feed box containing a DC power meter and either a center tap ground, positive ground, or negative ground. The center tap ground may have and impedance center tap ground using grounding resistors, leakage current sensors on ground leads, and fast acting fusing to minimize arc flash exposure. The overhead busway system may have branch circuit drop boxes for each equipment rack containing 380v DC rated fast acting circuit breakers, fuses, ground fault detection and protection, and 380v DC power metering. The modular DC power distribution system may use 380v DC rated drop cords connected to 380v DC rated plug strip power distribution units (PDUs) or 380v DC rated pin and sleeve connectors. The modular DC power distribution system may be made inherently safer by incorporating fault activated current and voltage limiting devices and control systems to quickly and safely isolate and disconnect short circuits occurring during installation, maintenance or operations of the power distribution system.

A modular DC power distribution system may use a four bus overhead busway system may feed equipment racks from two differing sources, such as a primary source using a rectifier system and a secondary source using an alternative energy source, such as wind, solar, full cell, zinc-bromine battery or others. The modular DC power distribution system may be fed from a DC power collector bus operating between 250 volts DC to 600 volts DC. An AC utility power source or an AC generator power source may feed the collector bus via a modular rectifier. An alternative energy power source may provide power to the collector bus, such as solar cells, wind turbines, fuel cells, zinc-bromine batteries, and an engine generator. A large scale energy storage flow batteries may feed the collector bus through DC to DC converters. An energy storage module, such as an ultra-capacitor system or a flywheel system, may provide short-term energy to allow for uninterrupted transitions between utility powers, generator power and large scale energy storage. The energy storage module may bi-directionally stabilize the DC power on the power pathway module.

The modular DC power distribution system may be constructed from commercial off the shelf (COTS) modules. The modular DC power distribution system may have an energy storage module. The energy storage module may be a DC power system with a combination of flywheels, ultra-capacitors, and large grid edge scale energy storage to provide voltage stabilization and ride thru during a utility outage.

A single power quality monitoring (PQM) module may monitor multiple system points for AC and DC power. The PQM module may be a network based system that allows system monitoring from any place that internet access is available. Multiple point monitoring may provide total system performance data from a single, time synchronized, system.

The modular DC power distribution system for a data center may utilize a cord or safety plug connector equipped with a spring loaded hasp, and a pilot circuit. The pilot circuit may ensure that circuit breakers feeding the plugs are shunt tripped and in the off position prior to connecting or disconnected the 380 volts DC plugs or connectors. The modular DC power distribution system may use a busway system. The critical load may be distributed by four busway bars for redundancy or for double capacity to the critical load. A DC to DC converter converts a high voltage range to 380 volts DC for direct distribution to computer loads. DC rated circuit breakers may be used in place of DC rated fuse functionality for short circuit protection and over-load protection. Circuit drop boxes may also be equipped with ground fault detection and protection and 380 volts DC power metering. The busway may feed a plug strip or pin and sleeve connectors rated at 380 volts DC and up to 200 amperes. A plug strip may utilize new receptacles rated for 380v DC power distribution systems.

The computer loads supplied by the modular DC power distribution system may be ICT equipment. The ICT equipment may be housed within equipment racks equipped for inherent safety. A door of the equipment rack may be connected to a shunt trip circuit in order to shunt trip the DC power at the busway when equipment rack doors are opened by a system operator or maintainer. The ICT equipment within the equipment racks may be equipped with an internal power converter. An internal power converter may convert the DC power with a range of 250 volts to 600 volts to an internal DC power with a low voltage range of 2 volts to 60 volts for internal equipment utilization. Additionally, the internal power converter may convert the nominal 380 volts DC to AC to migrate existing equipment to the new system. The modular DC power distribution system may have an internal remote battery pack connected to the low voltage side of each power supply for system back-up power during occasions where the 380 volts of DC power is not available. The equipment rack may be equipped with a battery pack mounting rack module to hold an individual battery pack for each piece of ICT equipment. The individual battery packs may be equipped with an internal monitoring module to display battery health. In addition, each battery pack may have the capability of communicating battery capacity and health through individual ICT power supplies. Battery packs may have the capability of being charged via the ICT power supplies or from an independent charging system separate from ICT power supplies.

FIG. 1 is an exemplary high reliability DC power distribution system, indicated generally as 130. Normal utility power and generator power may be supplied to distribution panels 102 at approximately 277 to 480 volts AC. A plurality of rectifiers 104 may provide 250 volts DC to 600 volts DC, with a nominal voltage of 380 DC, to collector busses 106. Energy storage systems 108 may provide rapid emergency DC power to the collector busses 106 upon loss of AC power to the rectifiers. The collector busses 106 may feed power to a distribution bus 110, which may be divided into parallel, redundant busses 112 separated by normally open circuit breakers 114. The distribution bus 110 may feed power to both ends of a busway 116 having dedicated drops 118, such as a plug-in unit circuit drop box, to a plurality of rack 120 mounted DC-to-DC converters 122 or directly to servers or other equipment that operate at the voltage of the busway 116. While the nominal voltage on the busway 116 may be approximately 380 volts DC, high voltage DC power may be approximately between 250 volts DC to 600 volts DC.

An engine or generator, typically a diesel engine system, may be on the supply side of the system. The engine or generator may typically tied in at the service entrance point for the facility. Such an engine or generator may provide a rapid startup, emergency electrical power upon loss of power from the service utility.

Figure 2:
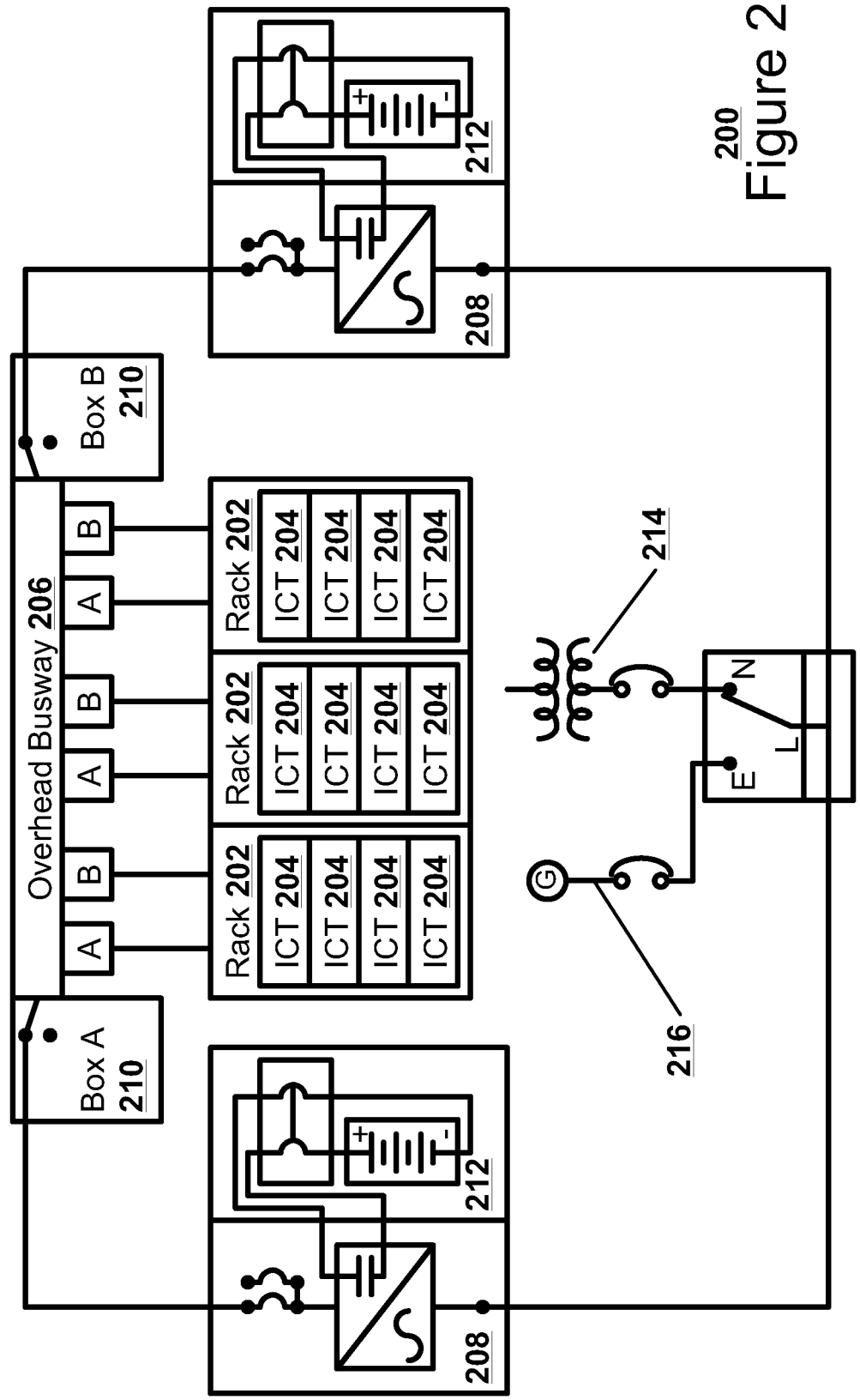
FIG. 2 illustrates an elevation plan of a single row system which provides a twice redundant 380v DC power feed to one row of equipment racks fed by an overhead busway.

FIG. 2 illustrates an elevation plan of a single row system 200 which provides a twice redundant 380v DC power feed to one row of equipment racks 202 of ICT equipment 204 fed by a power pathway module, such as an overhead busway 206. The overhead busway 206 may be configured with four bus bars and offers two paths of power for each equipment rack 202. Each end of the busway system 206 is fed by a rectifier system 208 via an end feed box 210. An AC to DC rectifier 208 may be utilized to act as the front-end power source for a high voltage DC distribution system that supports an entire critical operations environment instead of using a single use rectifier for a specific component. The high voltage DC power may be approximately 250 volts DC to 600 volts DC, with a nominal DC voltage of 380, although other appropriate voltages may be used. The rectifier system 208 may be constructed of 20 kW modules, with up to 14 modules per rack structure. Other module sizes and equipment rack 202 configurations may be provided for this purpose. The rectifier system 208 may perform hot swappable replacements, additions or subtractions. The rectifier systems may be connected to a battery cabinet 212 to provide energy storage back-up power when the rectifier AC power source is cycled between multiple sources, such as utility service 214 and engine generator service 216. Other forms of energy storage have been employed within this 380v DC power system in place of typical batteries, such as flywheels, flow batteries, fuel cells and alternative energy sources, in order to take advantage of the ease of integration with DC power sources.

Figure 3:
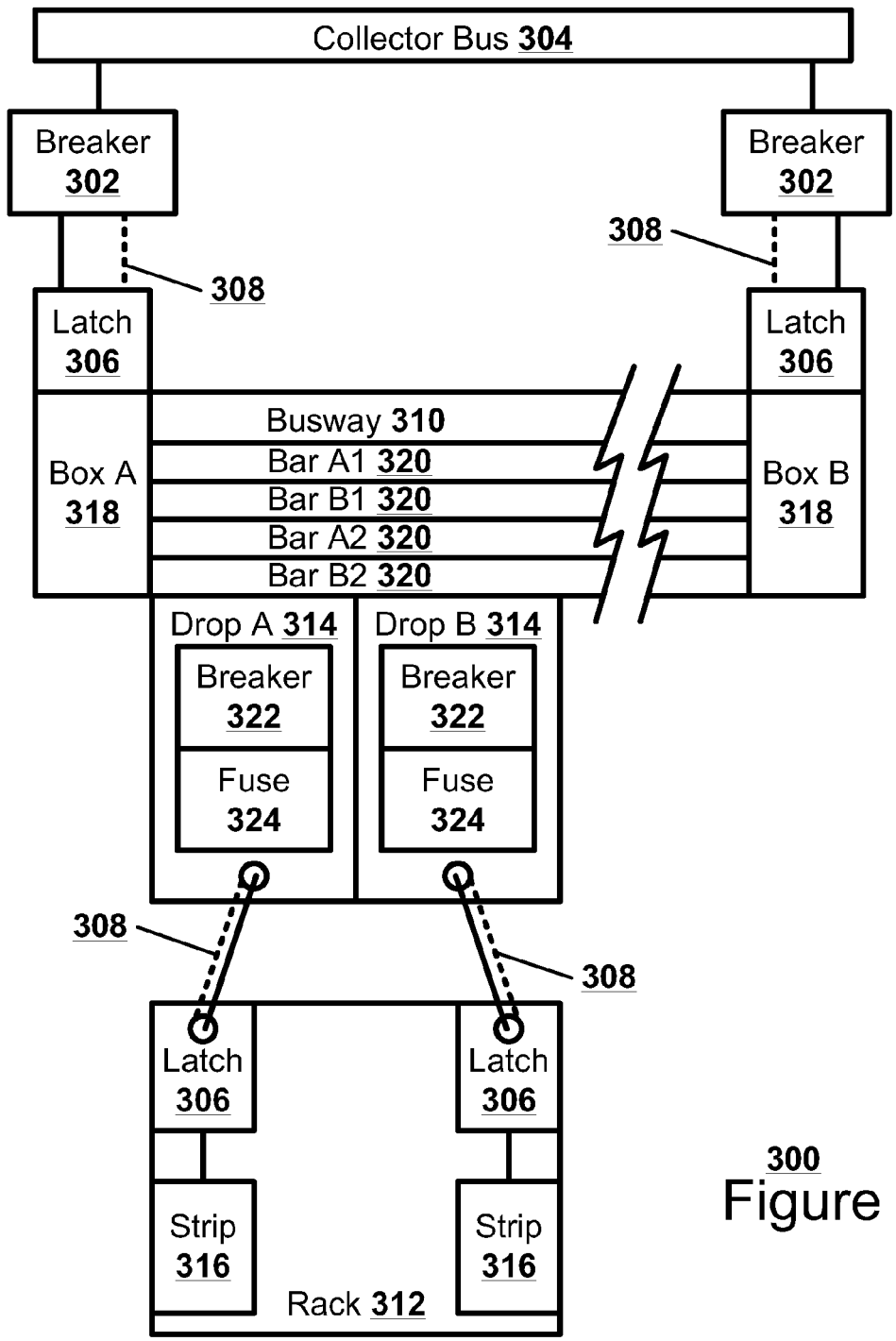
FIG. 3 shows specific components of the modular direct current power distribution system, with increased safety compared to alternating current systems.

FIG. 3 illustrates, in a block diagram, specific components 300 of the modular DC power distribution system 100, with increased safety compared to AC systems. In this embodiment, 380 v DC rated circuit breakers 302 feed 380 v DC power from the collector bus 304 to a spring actuated, safety latch-equipped connector 306, or a safety plug connector with a spring loaded hasp and pilot circuit. These spring actuated, safety latch-equipped connectors 306 may prevent energizing of the circuit until the male and female portions of the connector are firmly connected and latched. The latching mechanism 306 may be connected to a shunt-trip mechanism within the source breaker 302 by a signal cable 308. This connector arrangement may connect the source power to the overhead busway distribution system 310 for each equipment rack 312 from a circuit drop off 314 of the busway system 310. The 380 v DC rack power is provided by 380 v DC rated plug strips 316, connected to the circuit drop offs 314 by a spring actuated, safety latch-equipped connector 306 with an associated signal cable 308.

The busway 310 may provide a unique application. Instead of providing an AC distribution system with a single feed, the busway 310 may provide a DC distribution system that may be fed from multiple DC voltage matched sources via an end feed box 318. Alternatively, the busway 310 may be fed from two separate sources, one on each end, utilizing two bus bars 320 each. The busway 304 may have four separate bus bars 320 with a maximum rating of approximately 600 VDC for each. Two bus bars 320 may be fed by a primary source, labeled A, and the other two bus bars 320 may be fed by a secondary source, labeled B. The drops 314 from the busway 310 may then be selectable from either source. In one embodiment, the busway 310 may provide high voltage DC power to equipment rack locations within a compact package, with hot swappable or movable connectors that may be fed from separate DC power sources. The high voltage DC power may be approximately 250 volts DC to 600 volts DC, with a nominal DC voltage of 380. Circuit drops 314 may be equipped with suitable 380v DC rated circuit breakers 322 and accompanied with a 380v DC rated fuse 324 for added protection. In some embodiments, the secondary source may be a similarly configured, redundant rectifier rack and energy storage system or an alternative energy power source, such as a wind turbine, solar cell, fuel cell, zinc-bromine battery, or engine generator.

Figure 4:
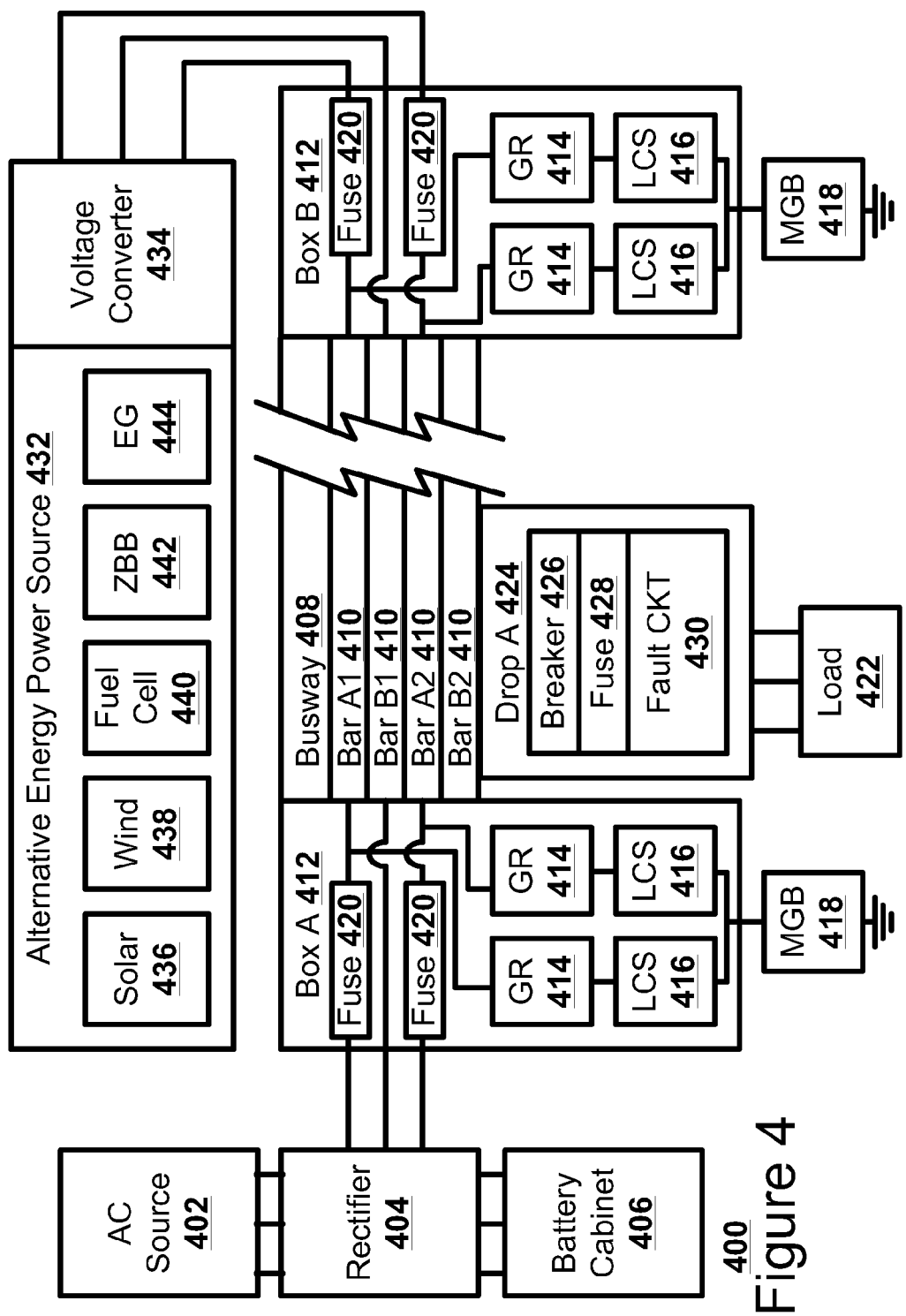
FIG. 4 illustrates in a wiring diagram a dual-source direct current power distribution system.

FIG. 4 illustrates in a wiring diagram a dual-source DC power distribution system 400. A center point grounding configuration may limit a 380v DC power system to +190v DC and −190v DC from conductor to ground. This configuration may be fed from a typical AC power source or service transformer 402 and rectified to 380v DC through a system rectifier 404. The rectifier may be coupled with an energy storage system, such as a battery cabinet 406, to provide power ride-through during AC source outages and transfers. The system rectifier 404 may then feed 380v DC to the busway 408, having four bus bars 410, with the connection made at an end feed box 412. The end feed box 412 may perform system grounding in a similar manner as a separately derived source within an AC system. The end feed box 412 may ground the positive and negative lines thorough high impedance center tap ground utilizing grounding resistors (GR) 414 and leakage current sensors (LCS) 416 leading to a main ground bus (MGB) 418. The end feed box 412 may also house fast acting 380v DC fuses 420 for added circuit protection. The busway 408 may feed equipment loads 422 through circuit drop boxes 424 that contain 380v DC branch circuit breakers 426 and fuses 428. Additional protection may be provided with ground fault circuit 430 sensing and protection as built within the 380v DC circuit breakers 424, such as a fault activated current and voltage limiting control module to isolate and disconnect a short circuit. Alternative energy sources 432 may be integrated and connected to this 380v DC power distribution system via a voltage converter 434. Alternative energy sources 432 may be a solar cell 436; a wind turbine 438; fuel cell 440; a large scale energy storage 442, such as zinc-bromine battery 442; or a back-up AC power engine generator 444.

Figure 5:
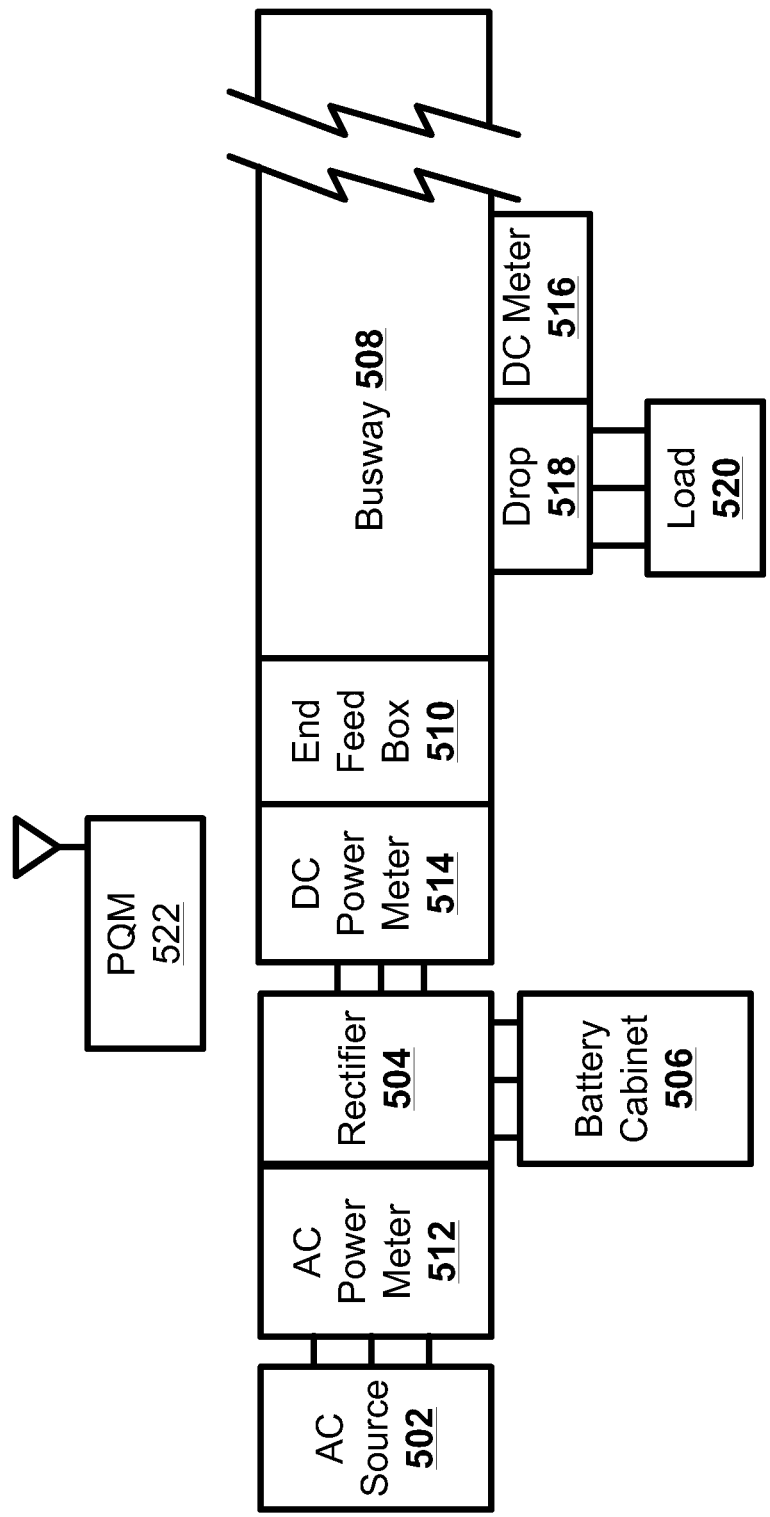
FIG. 5 illustrates an electrical protection system for the modular direct current power distribution system.

FIG. 5 illustrates an electrical protection system 500 for the modular DC power distribution system 100. The modular DC power distribution system may be configured as a floating system without either the positive, negative or center point grounded. A similar configuration may be created with either the positive leg grounded or the negative leg grounded. This configuration may be fed from a typical AC power source 502 or service transformer 502 and rectified to 380v DC through a system rectifier 504. The system rectifier 504 may be coupled with an energy storage system, such as a battery cabinet 506, to provide power ride-through during AC source outages and transfers. The system rectifier 504 may then feed 380v DC to the busway 508 with the connection made at an end feed box 510. The end feed box 510 may perform system grounding in a similar manner as a separately derived source within and AC system. An AC power meter 512 may be positioned on the AC input feed to the rectifier 504 to allow for input power documentation. Current transformers (CTs) are used to capture current in amps on the AC power feed. A 380v DC power meter 514 is shown on the output of the system rectifier 504 and may be incorporated within the busway end feed box 510, within the rectifier 504, or within a separate enclosure. DC current measurements may be achieved using a direct connection to the meter 514, a suitably rated shunt, or through suitably rated Hall Effect CTs. Branch circuit metering 516 may be incorporated within busway circuit drop boxes 518 connected to the load 520. DC current measurements may be achieved using a direct connection to the meter, a suitably rated shunt, or through suitably rated Hall Effect CTs. All meters are networked together using Modbus RTU communication protocol. A PQM module 522 may retrieve data from each meter using a data acquisition system. Data communications may use wired and wireless communications.

Figure 6:
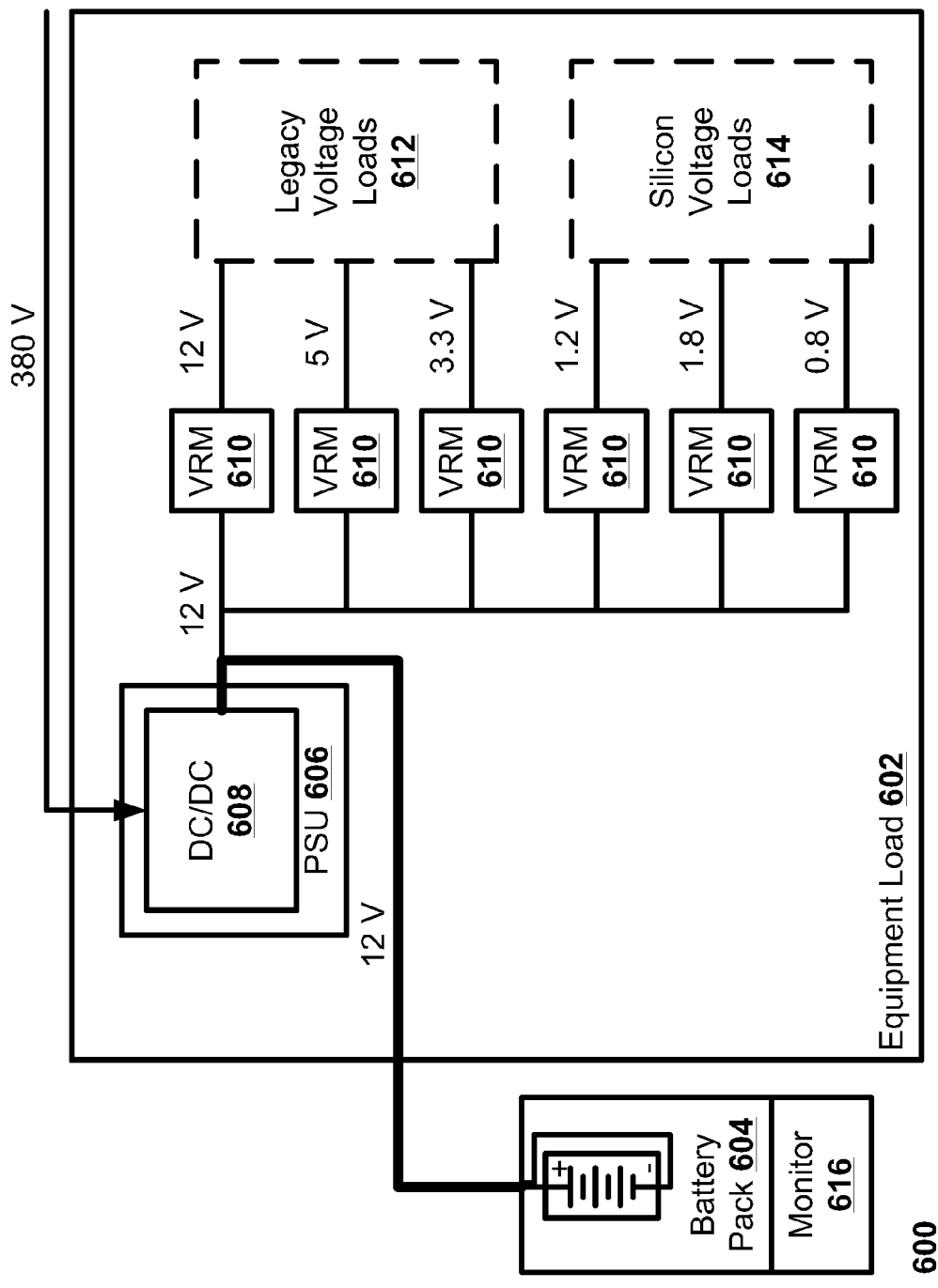
FIG. 6 illustrates further features of an individual backup power system.

FIG. 6 illustrates further features of an individual backup power system 600. Each equipment load 602 may be connected to an individual battery 604 for back-up power requirements. The individual equipment power supply unit (PSU) 606 may be configured to accept 380v DC at the input and provide 8 to 55 volts DC on the output, with a nominal voltage of 12 volts DC. The PSU 606 may use an internal DC to DC power converter 608 to convert the DC power with a range of 250 volts to 600 volts to an internal DC power with a range of 2 volts to 60 volts for internal utilization. The individual equipment PSU 606 may alternatively be configured to provide other DC voltages as desired by equipment components within the equipment. A voltage regulator module (VRM) may adjust the nominal 12 volts to level appropriate for loads 612 capable of accepting legacy voltage levels and for loads 614 capable of accepting silicon voltage levels.

An individual battery 604 may be connected on the low voltage DC side of the PSU 606 from 8-55V DC. The battery connection may be similar to a typical battery connection within a laptop computer with battery metering, charging and discharge management similar to how a laptop computer operates today. The individual battery pack 604 may have an internal monitoring module 616 to check battery health.

Figure 7:
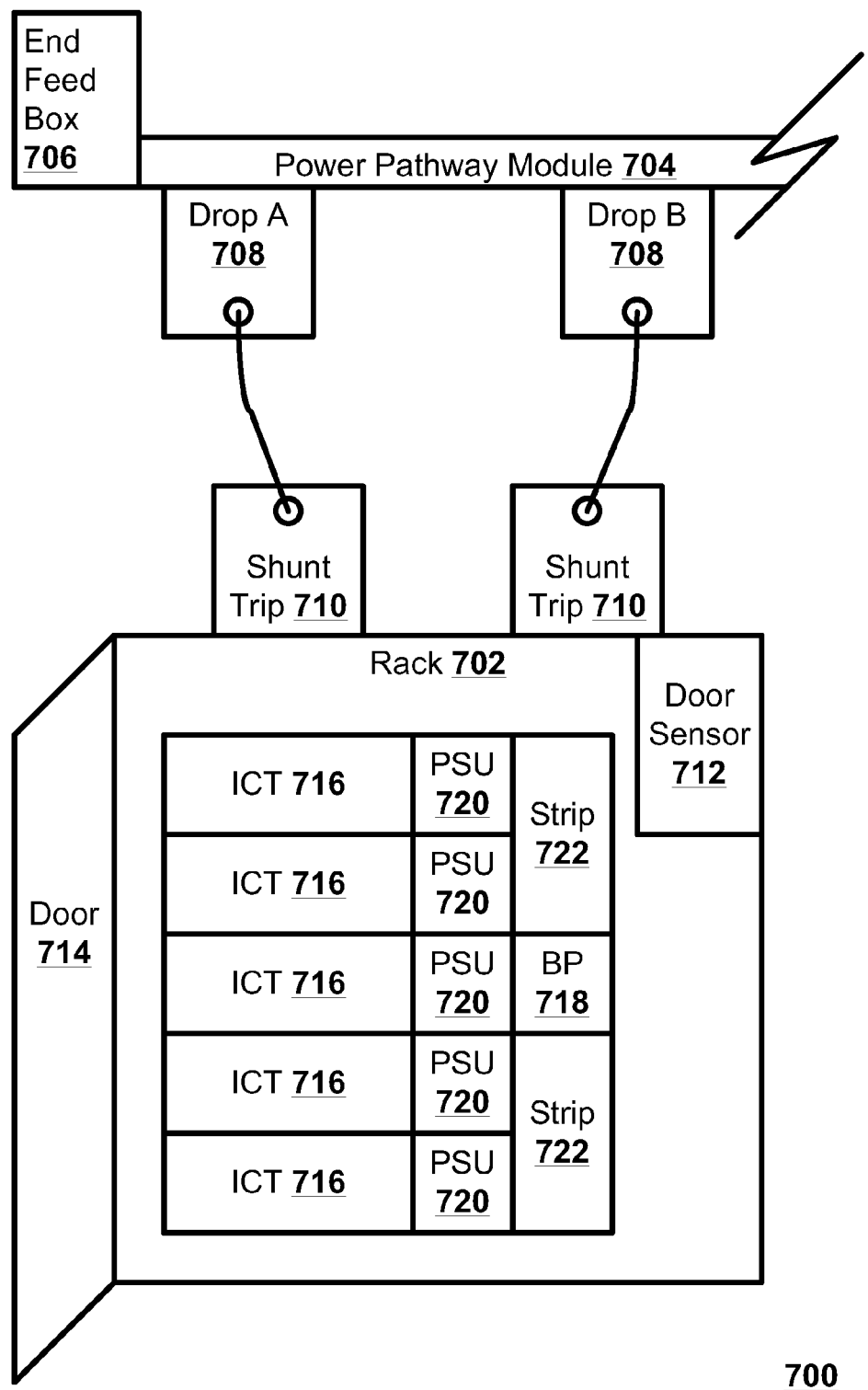
FIG. 7 illustrates in a wiring diagram a battery pack mounting rack module.

FIG. 7 illustrates in a block diagram a battery pack mounting rack module 700. Servers or equipment with integral batteries within equipment racks 702 may be powered by 380v DC from the overhead busway systems 704 under normal operating conditions. The overhead busway system 704 may receive DC power from an end feed box 706. Equipment racks 702 may be powered by circuit drops 708 from the busway 704. Connectors with shunt trip interlocks 710 may be used for rack power connections to the 380v DC source bus 704. Each rack 702 may be configured with a door sensor switch 712 which, when upon sensing that a rack door 714 is open, may send a shunt trip signal to the circuit breaker within the circuit drop box 708 feeding the associated rack 702. This action may disconnect 380v DC power from the rack 702 and the ICT equipment 716 within the rack 702 may default to battery pack (BP) 718 back-up operation while the door 714 is open. Once the door is re-closed, the source breakers may be reset and closed to again provide normal 380 volts DC power via a set of PSUs 720 and a set of 400 volt DC plug strips 722 to the ICT equipment 716 within the associated rack 702.

Figure 8:
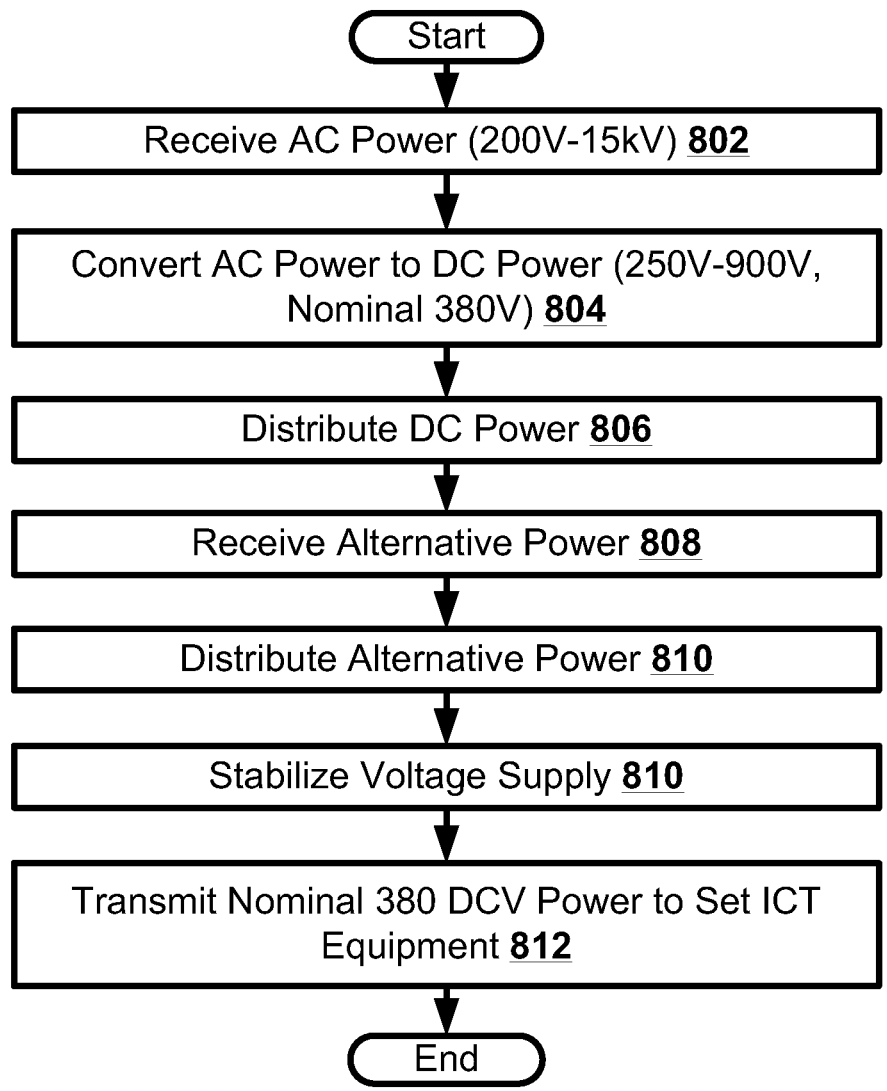
FIG. 8 illustrates, in a flowchart, a method for distributing direct current power to information and communication technology equipment.

FIG. 8 illustrates, in a flowchart, a method 800 for distributing direct current power to information and communication technology equipment. The modular rectifier 104 may receive AC power with a voltage range between 200 volts and 15000 volts (Block 802). The modular rectifier 104 may convert AC power to DC power with a voltage range between 250 volts and 600 volts, with a nominal voltage of 380 volts (Block 804). A power pathway module 116, such as a busway 116, may distribute the DC power from the modular rectifier 104 to a set of dedicated drops 118 (Block 806). An end feed box 405 may receive alternative energy power from an alternative power source 412 (Block 808). A power pathway module 116, such as a busway 116, may distribute the alternative energy power to a set of dedicated drops 118 (Block 810). An energy storage module 108 may bi-directionally stabilize the DC power on the power pathway module (Block 812). The energy storage module 108 may have at least one of a flywheel, ultra-capacitor, and a large grid edge scale energy storage. The set of dedicated drops 118 may transmit the nominal 380 volts of direct current power to a set of ICT equipment (Block 814).

Figure 9:
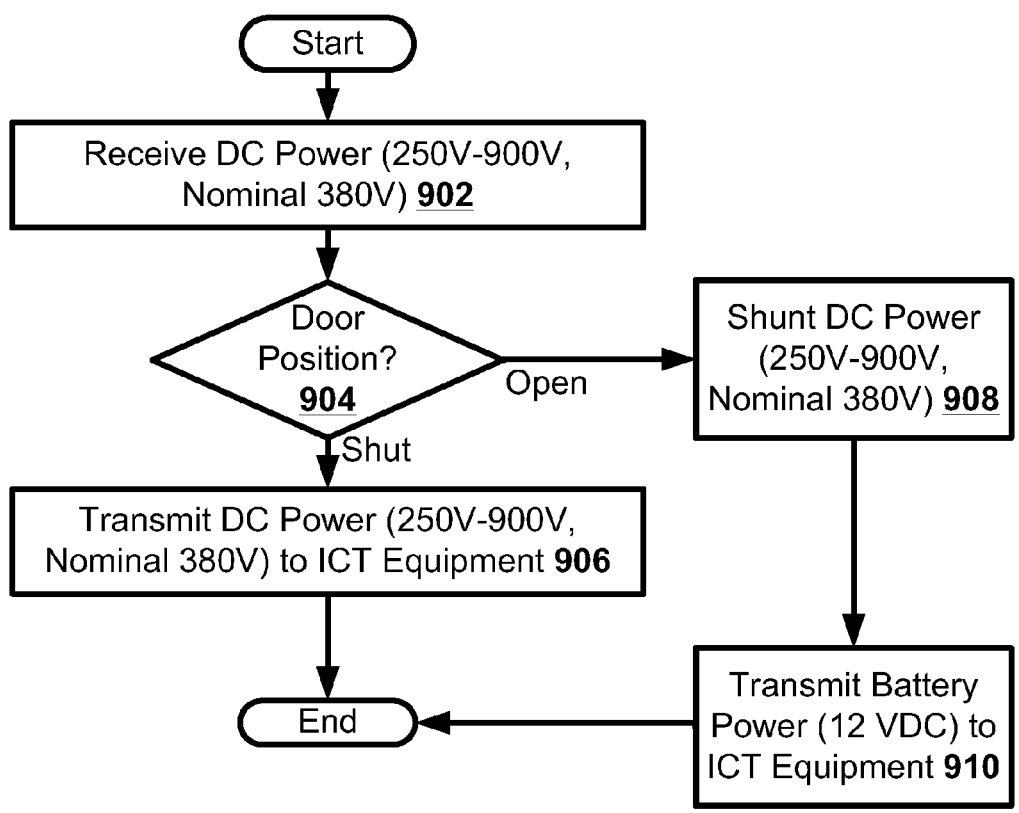
FIG. 9 illustrates, in a flowchart, a method for using a shunt to protect the modular direct current power distribution system.

FIG. 9 illustrates, in a flowchart, a method 600 for using a shunt to protect the modular DC power distribution system 100 and guard against electrical damage. An equipment rack may receive from a dedicated drop 118 DC power with a voltage range between 250 volts and 600 volts, with a nominal voltage of 380 volts (Block 902). If the door to the equipment rack is closed (Block 904), the equipment rack may transmit the DC power from the dedicated drop 118 to the ICT equipment (Block 906). If the door to the equipment rack is open (Block 904), the equipment rack may shunt the DC power (Block 908). The equipment rack may transmit battery power having a voltage of around 12 volts to the ICT equipment (Block 910).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A modular direct current power distribution system, comprising:
    an alternating current distribution panel that receives alternating current power with a voltage range between 200 volts and 15000 volts;
    a modular rectifier that converts the alternating current power from the distribution panel to direct current power with a range of 250 volts to 600 volts;
    an end feed box that receives
    a power pathway module that distributes the direct current power from the modular rectifier to a set of information and communication technology equipment;
    an electrical protection system that guards against electrical damage; and
    an internal remote battery pack that provides system backup power.

2. The modular direct current power distribution system of claim 1, wherein the electrical protection system has at least one of fast acting circuit breaker, a blocking diode, a spring activated latching connector, a voltage meter, a current meter, a power meter, center tap ground with impedance center tap ground, a leakage current sensor, and fast acting fusing.

3. The modular direct current power distribution system of claim 1, further comprising:
    a power quality monitoring module for multiple system point monitoring of alternate current power and direct current power.

4. The modular direct current power distribution system of claim 1, further comprising:
    a safety plug connector with a spring loaded hasp and pilot circuit to connect the power pathway module to an electronic device of the set of information and communication technology equipment.

5. The modular direct current power distribution system of claim 1, further comprising:
    a plug-in unit circuit drop box, equipped with a shunt trip breaker, a direct current rated fuse, and a drop cord, to connect the power pathway module to an electronic device of the set of information and communication technology equipment.

6. The modular direct current power distribution system of claim 1, further comprising:
    an equipment rack with a door connected to a shunt trip circuit to shunt trip the direct current power from the power pathway module when the door is open.

7. The modular direct current power distribution system of claim 6, further comprising:
    an internal power converter that converts the direct current power with a range of 250 volts to 600 volts to an internal direct current power with a range of 2 volts to 60 volts for internal utilization.

8. The modular direct current power distribution system of claim 6, further comprising:
    a battery pack mounting rack module to hold an individual battery pack for an electronic device of the set of information and communication technology equipment.

9. The modular direct current power distribution system of claim 8, further comprising:
    an internal monitoring module to check battery health of the individual battery pack.

10. The modular direct current power distribution system of claim 8, further comprising:
    a fault activated current and voltage limiting control module to isolate and disconnect a short circuit.

* * * * *